Figure 1:
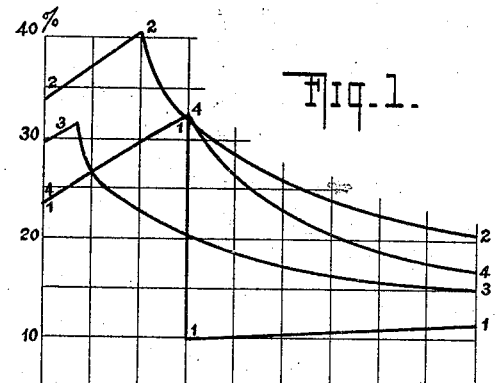

June 21, 1927.

W. SCHMIDT

POWER PLANT FOR WARSHIPS

Filed March 30, 1921

1,632,925

2 Sheets-Sheet 1

WITNESS

G. V. Rasmussen

INVENTOR
WILHELM SCHMIDT
BY
Bresen Schenk
ATTORNEYS

June 21, 1927.

W. SCHMIDT

POWER PLANT FOR WARSHIPS

Filed March 30, 1921

1,632,925

2 Sheets-Sheet 2

WITNESS

INVENTOR
WILHELM SCHMIDT
BY
ATTORNEYS

Patented June 21, 1927.

1,632,925

UNITED STATES PATENT OFFICE.

WILHELM SCHMIDT, OF CASSEL-WILHELMSHOHE, GERMANY, ASSIGNOR TO SCHMIDT'SCHE HEISSDAMPF-GESELLSCHAFT M. B. H., OF CASSEL-WILHELMSHOHE, GERMANY, A GERMAN CORPORATION.

POWER PLANT FOR WARSHIPS.

Application filed March 30, 1921, Serial No. 457,143, and in Germany November 9, 1917.

The present invention relates to improvements in power-plants for warships. Such ships generally have a main power-plant for high speed and an auxiliary power-plant for cruising. It has been proposed to employ internal combustion engines for the auxiliary power-plant, on account of their relatively high thermic efficiency. There is, however, this drawback with internal combustion engines, that their output can be varied but slightly if they are to operate economically. Now, the cruising speeds of modern warships vary quite considerably. Thus, there is the slow cruising speed, for instance from 9 to 12 nautical miles an hour, which is used, as a rule, for long voyages; again, there are higher cruising speeds, for instance from 12 to 18 nautical miles an hour. If the internal combustion engines are made of proper horse-power for the higher cruising speeds, their efficiency is reduced very materially when the ship proceeds at low cruising speed, thus losing the advantage which internal combustion engines have over steam engines. Moreover, in the case of large ships, there arises a further difficulty for the reason that so far it has not been found possible to construct reliably operating internal combustion engines beyond a certain power.

The object of my present invention is to avoid the drawbacks mentioned above. For this purpose, I employ, both at low cruising speed and at the higher cruising speeds, an internal combustion engine working in conjunction with a steam engine using steam generated with the aid of the waste heat of the internal combustion engine. The arrangement is such that at low cruising speed the steam engine is fed exclusively with steam obtained by utilizing such waste heat, while at higher cruising speeds there is supplied to the steam engine, in addition to the steam produced with the aid of said waste heat, steam generated by some other source of heat, for instance live steam from the boilers of the main power-plant. The internal combustion engine is so proportioned that the total efficiency of the plant consisting of the internal combustion engine and of the steam engine will, at low cruising speed, be at least equal to the efficiency of an internal combustion engine considered alone. The cylinders of the internal combustion engine, the cooling jackets of which are utilized for the generation of steam, are preferably combined with a steam and water collector common to all cylinders, the water level in said collector lying above the level of the cylinder heads and said collector being supplied with the feed water which serves to replace the water converted into steam within the said jackets and consumed in the steam engine.

Figure 2:
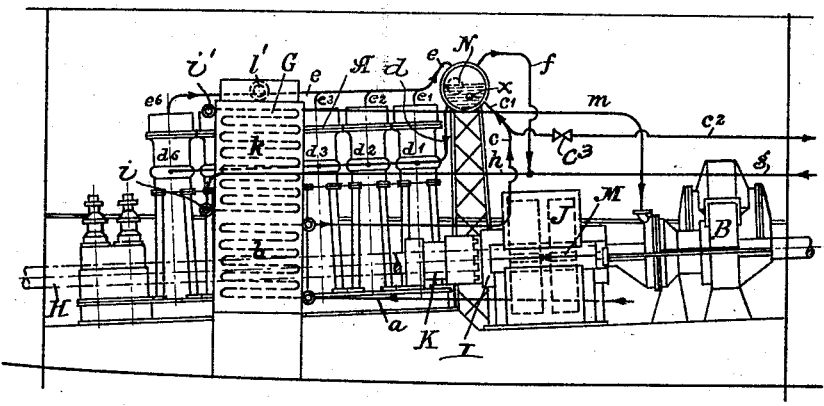
Figure 4:
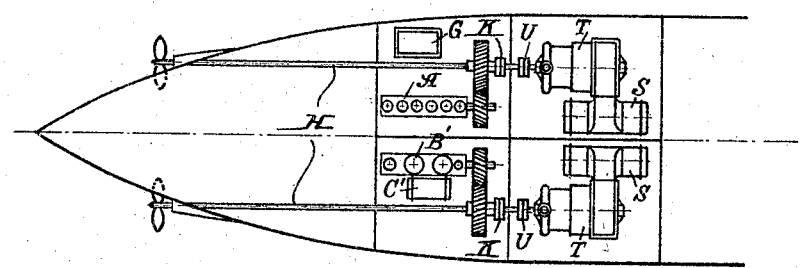
Figure 5:
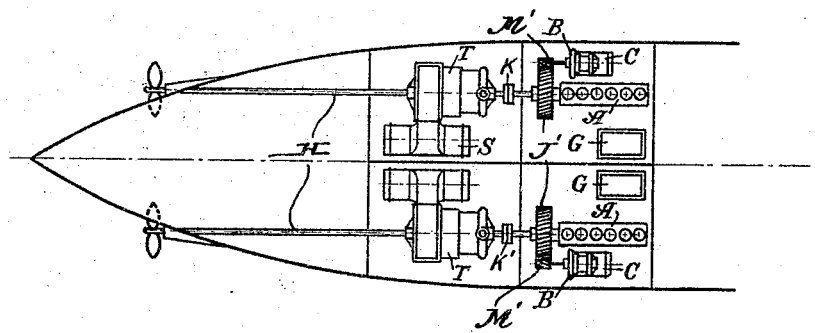
Figure 6:
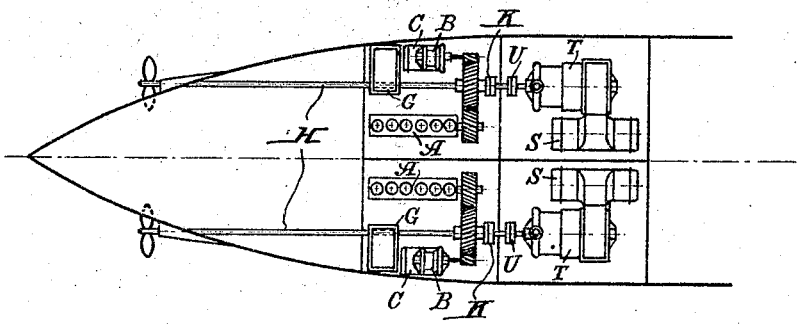

For a more detailed explanation of the principle of my invention and of the forms of construction in which it may be reduced to practice, I will now refer to the accompanying drawings, in which Fig. 1 is a diagram illustrating the conditions obtained with my invention, as compared with conditions prevailing with arrangements employed hitherto; Fig. 2 is a side elevation and Fig. 3 a plan view showing one form of cruising power plant according to my invention; and Figs. 4, 5 and 6 are plan views of three forms of power plants including a main power plant and a cruising power plant embodying my invention.

The diagram, Fig. 1, illustrates conditions in a particular typical case. The abscissæ represent cruising speed, in nautical miles per hour, while the ordinates represent the total thermic efficiency.

In the particular typical case illustrated by Fig. 1, it has been assumed that the cruising power-plant is to develop 2000 effective H. P. at a speed of 12 miles per hour.

The line 1—1 shows the course of the thermic efficiency in a plant constructed according to well known plans. The internal combustion engine is dimensioned to produce a speed of 12 nautical miles per hour. At this speed, therefore, the internal combustion engine has its greatest efficiency of 32 per cent and the highest permissible piston speed. With lower cruising speeds, the efficiency will be reduced, while at higher speeds, the internal combustion engine must be disconnected and the main steam engines thrown into action. Assuming that these main engines (for instance steam turbines) are operated with saturated steam, as is the current practice on warships, the efficiency will drop at once to less than 10 per cent whenever this change to main engine power is made, whereupon the efficiency will again rise slowly.

In contrast to the above, line 2—2 shows the efficiency conditions of a cruising power-plant embodying the present invention. As stated above, the total thermic efficiency at low cruising speed is to equal that of an independent internal combustion engine developing the same horse-power; in order to meet this condition, the steam engine should perform about one-third of the joint work of both engines, at the limit or transition from low cruising speed to higher cruising speed, which transition limit may be, for instance, at 12 nautical miles per hour. Therefore, at 12 nautical miles, the internal combustion engine has to furnish only two-thirds of 2000 H. P., that is to say, 1333 effective H. P. Since the internal combustion engine is intended to run jointly with the steam engine up to 18 nautical miles per hour, such internal combustion engine is to be constructed to deliver a H. P. corresponding to the number of revolutions at 18 nautical miles, that is to say, $$1333 \times \frac{18}{12} = 2000 \text{ effective H. P.}$$

The dimensions of the internal combustion engine will therefore be exactly the same as in the case first discussed above with reference to the line 1—1 of the diagram Fig. 1. If the cruising speed is reduced below 12 nautical miles, by diminishing the supply of steam from the main boilers, the total efficiency will rise, attaining its maximum (about 41 per cent) when the addition of supplemental steam is discontinued, so that the engine is run exclusively by the steam generated with the aid of the waste heat; this particular condition, in the case under consideration, arises at a speed of about 11 nautical miles. Upon a further reduction of the number of revolutions, the efficiency will decrease again, but at a speed of 9 nautical miles per hour, will still amount to 34 per cent. Should the speed rise above 12 nautical miles, the total efficiency will fall in this case also, but at a speed of 18 nautical miles per hour the efficiency will still exceed 20 per cent. These data are based on the assumption that both the steam from the main boiler plant and the steam generated by utilizing the waste heat, are superheated, for instance, to from 300 to 350° centigrade.

For all speeds, the line 2—2 will remain above the line 1—1.

If the cruising power-plant consisted of an independent steam engine and an independent internal combustion engine of 2000 effective H. P. running in conjunction with said steam engine up to the speed of 18 nautical miles per hour, it would be necessary to throw in the steam engine at a relatively low speed, viz, about 9⅔ nautical miles per hour. In that case, the efficiency would be as indicated by the curve 3—3, assuming that the steam engine is run with saturated steam, as was the general practice hitherto with warships. In this case, there is indeed an advantage, as compared with the operation according to the line 1—1, at cruising speeds exceeding 12 nautical miles per hour, yet even then the results are materially inferior to those represented by the curve 2—2.

If the internal combustion engine is made of sufficient size to deliver 2000 effective H. P. at a ship speed of 12 miles per hour, and if at cruising speeds of from 12 to 18 miles, this engine is operated in conjunction with a separate independent cruising steam turbine, such internal combustion engine will deliver 3000 effective H. P. at the number of revolutions corresponding to said speed of 18 miles. The dimensions of the engine will have to be based on this output. Such engine would be 50 per cent larger than an internal combustion engine operating according to my present invention, with utilization of waste heat, and would have an efficiency such as indicated by the curve 4—4. In this case also, the total thermic efficiency remains considerably below the figures indicated by the line 2—2 (corresponding to my present invention). In plotting the curve 4—4, I have assumed that the cruising steam turbine is operated with saturated steam, as has been customary in warships. Should this turbine be operated with superheated steam, the right-hand portion of the curve 4—4 would approximate the curve 2—2 more closely. Even then, as to the lower cruising speeds, the superiority of my new arrangement would remain. It should also be borne in mind that the internal combustion engine is 33% smaller with this new arrangement.

Figure 3:
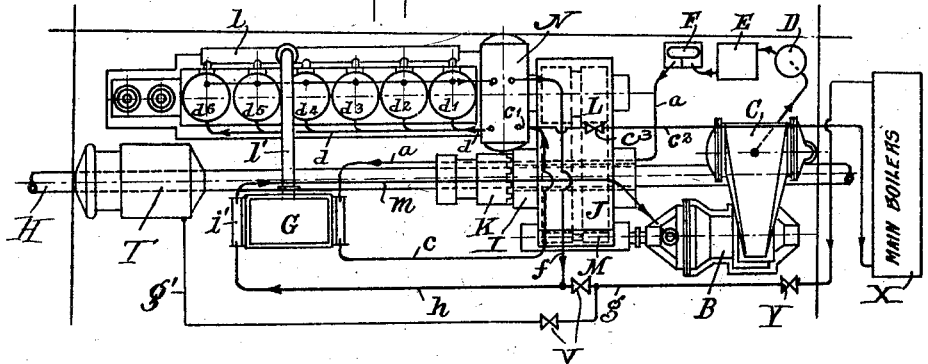

In the example of my invention illustrated by Figs. 2 and 3, A is the internal combustion engine and B the steam turbine which at low cruising speed is operated exclusively by steam produced with the aid of the waste heat of the internal combustion engine, while at higher speeds this turbine receives, in addition, a supply of live steam from the boilers X (indicated in Fig. 3). C is the steam condenser, D the moist air pump, E the feed water tank, and F the feed water pump. The delivery port of this pump is connected by a pipe $a$ with the lower end of a heating coil $b$ located in the lower portion of a heater G the upper end of which receives the exhaust from the exhaust manifold $l$ through a pipe $l'$, the exhaust escaping into the atmosphere at the bottom of the heater G. The upper end of the coil $b$ is connected by pipes $c$, $c'$ and the feed water regulator $x$ (which may be a float-controlled admission valve of a type well known in this art) to the lower portion of the steam and water collector N; another connection, through pipe $c^2$ (with a shut-off cock $c^3$) enables the heated feed water or part of it, to be directed to the steam boilers indicated at X in Fig. 3. From the water space of the collector N the warm water passes through pipes $d$, $d'$, $d^2$, $d^3$, $d^4$, $d^5$, $d^6$, to the lower portions of the jackets of the internal combustion cylinders. The upper portions of these jackets are connected by steam pipes $e'$, $e^2$, $e^3$, $e^4$, $e^5$, $e^6$ and $e$ to the upper portion or steam space of the collector N. Steam from this space passes through a pipe $f$, and steam from the boilers may be supplied through a pipe $g$, the steam from the collector N, either alone or mixed with boiler steam, passing through a pipe $h$ to the lower head $i$ which is connected with the lower end of the superheater coil $k$ located in the upper portion of the heater G. The upper end of the superheater coil $k$ is connected with the upper head $i'$ from which a pipe $m$ leads the superheated steam to the turbine B.

The screw propeller shaft H lies axially within the hollow, separately journalled sleeve or hub I of the gear wheel J, which in the condition illustrated is held to turn in unison with the shaft H, by means of a clutch K. If the clutch is disengaged, the propeller shaft will be disconnected from the gear wheel J, which is the member through which the said shaft is thrown into or out of operative connection with the auxiliary power-plant or cruising power-plant. It will be understood that the shaft H is loose within the sleeve or hub I. The gear wheel J is in mesh with another gear wheel L mounted on the shaft of the internal combustion engine A, and also meshes with a pinion M mounted on the shaft of the turbine B. The steam generated in the boilers X passes through the pipe $g$ to the pipe $h$ mentioned above, and may also be directed from the collector pipe $g$ through a branch pipe $g'$ to the main engine (turbine) T operating the propeller shaft H at high speeds. Suitable shut off devices of any well-known or approved construction (indicated at Y) would be provided in the pipes $g$ and $g'$ so that the steam from the main boilers X could be admitted to, or shut off from, the pipes $g'$ and $h$ as desired.

The operation will be understood readily. The internal combustion engine may use any suitable fuel, even crude oil. The feed water pump F draws from the tank E the water resulting from the condensation of the exhaust steam of the turbine B and forces said water through pipe $a$, heating coil $b$, and pipe $c$ either to pipe $c'$ and collector N, or to pipe $c^2$ and the steam boilers. Of course, the feed water is heated, while passing through the coil $b$, by the coolest part of the exhaust gases. The portion of the water conveyed to the collector is converted into steam by the heat of the cylinder jackets, the water passing to pipe $c^2$ is converted into steam in the boilers. The water reaching the collector N through pipe $c'$, is mixed with other water and conveyed to the lower portions of the cylinder jackets. Part of the water in these jackets is converted into steam, and the resulting mixture of steam and water is driven upward by the hydrostatic pressure of the water column in the descending pipe $d$, the steam-and-water mixture thus passing through the cylinder heads and cooling them, and thus rising through pipe $e$ into the steam space of the collector N; here a separation of water from steam takes place. The steam from the collector, either alone or mixed with steam coming from the boilers through the pipe $g$, passes through the pipe $h$ to the superheater coil $k$, which is exposed to the hottest portion of the exhaust gases, and the steam thus superheated passes to the turbine B through the pipe $m$. The level of the water in collector N is above the highest points of the cooling jackets, so that there is sufficient fall for the automatic circulation of the cooling water. In most warships, it is necessary to use an inclined propeller shaft; owing to this inclination, the cylinder heads are at different levels. If the collector N were omitted, it would be necessary to preserve a different level in each hollow cylinder head, or, assuming a uniform water level, it would be necessary to give the cylinder heads different heights or to make some of them needlessly high, so that the engine would be unsuitably high.

It will be understood that the cruising power plant constructed according to my invention is additional to the main power plant used at high speeds, as in action. Figs. 2 and 3 illustrate an example of the improved cruising power plant, the main power plant being indicated in Fig. 3 by the boiler or boilers X, collector pipe $g$, main engine T (this may be a turbine), branch pipe $g'$, and shut-off devices Y. By arranging the cruising power-plant as a unit independent of the boilers supplying steam to the main engines, I secure the further important advantage of being able to shut off the steam pipes leading from the said boilers, and propel the ship exclusively by the cruising power-plant, as in the event of injury to the boilers during battle. In this case, the cruising power-plant (consisting of the internal combustion engine and a steam engine utilizing the waste heat of the first-named engine) will operate in very much the same manner as the independent internal combustion engine of the well known power-plants referred to above. Figs. 4, 5 and 6 represent three different ways of combining two cruising power plants of the general type shown in Figs. 2 and 3, with the main power plant, in the case of a twin-screw ship having individual power plants for each propeller.

In Fig. 4, the cruising power plant lies astern of the main turbines T and their condensers, that is to say, between the main power plant and the propellers. When cruising, the main turbines are thrown out of action by suitable valves or gates (not shown), and are disconnected from the propeller shafts by the proper operation of suitable clutches indicated at U, and one of the propeller shafts is driven by the internal combustion engine A, the other propeller shaft being driven by the steam engine B′ utilizing the waste heat of engine A. In this particular case, the steam engine B′ is illustrated as a triple expansion reciprocating piston engine having two low-pressure cylinders. C′ is the condenser of engine B′, and G the heat exchanger or exhaust gas utilizer of the kind described with reference to Figs. 2 and 3. When the speed is increased, as in action, the propeller shafts are operated by the main turbines T, the cruising power plant being disconnected by a proper operation of the clutches K (Figs. 2 and 3).

According to Fig. 5, the main turbines T, with their condensers S, are astern of the cruising power plant. In this case, at cruising speed, the rotors of these main turbines will rotate idly in a vacuum. When cruising, the propeller shafts are driven direct by the internal combustion engines A, and, through the medium of gearing M′, J′, by the steam turbines B utilizing the waste heat of the said internal combustion engines. At speeds above cruising speed, the cruising power plants are uncoupled from the respective propeller shafts by throwing out the clutches K′.

Fig. 6 shows the combination of main turbines T located ahead of two cruising power plants the details of which correspond to Figs. 2 and 3. By throwing out clutches U (say, mechanical or hydraulic clutches), the main turbines T are disconnected from the propeller shafts when traveling at cruising speeds. At low cruising speeds, the shut off devices Y controlling the admission of steam from the main boilers X to the pipes g′ and h (and through them to the main engines T and auxiliary steam engines B respectively) would be closed. The auxiliary steam engines (turbines) B therefore would in this case receive steam from the pipes f exclusively, and would thus be driven by steam generated by the waste heat of the internal combustion engines. At higher cruising speed, there would be added to the steam thus generated by such waste heat, a certain amount of steam supplied by the main boilers X, upon opening the shut-off devices located in the collector pipes g. At speeds above cruising speeds the main engines T (which until then have remained idle) would be brought into action, by opening the shut-off devices which control the branch pipes g′ leading from the collector pipes g to said main engines T. If it is desired to dispense with the propelling action of the internal combustion engines A and of the auxiliary steam engines B at the time the main engines T are connected up as described, the shut-off devices in the collector pipes g will be closed. This would also be done in the event of injury to the main boilers X or the main engines T, so that in this case the ship could be propelled exclusively by the cruising power plant.

Various modifications in the relative position of the cruising turbines and the main turbines may obviously be made without departing from the nature of my invention as set forth in the appended claims.

I claim:

1. In a power plant for ships, a main power plant for propelling the ship at speeds above cruising speeds, a generator for supplying said main power plant with steam, an additional power plant for propelling the ship at different cruising speeds, said additional plant comprising an internal combustion engine and a steam engine, another generator in which steam is produced by the waste heat of said internal combustion engine, and connections whereby said steam engine may receive steam either from the last-named generator only, in the case of low cruising speed, or from both generators, in the case of high cruising speed.

2. In a power-plant for ships, a main steam engine for propelling the ship at speeds above cruising speeds, a generator for supplying said main engine with steam, an additional power-plant for propelling the ship at different cruising speeds, said additional plant comprising an internal combustion engine and an auxiliary steam engine, another generator in which steam is produced by the waste heat of said internal combustion engine, and connections whereby said auxiliary steam engine may receive steam either from the last-named generator only, for low cruising speed, or from both generators, for high cruising speed.

In testimony whereof I have hereunto set my hand.

WILHELM SCHMIDT.